UNITED STATES PATENT OFFICE.

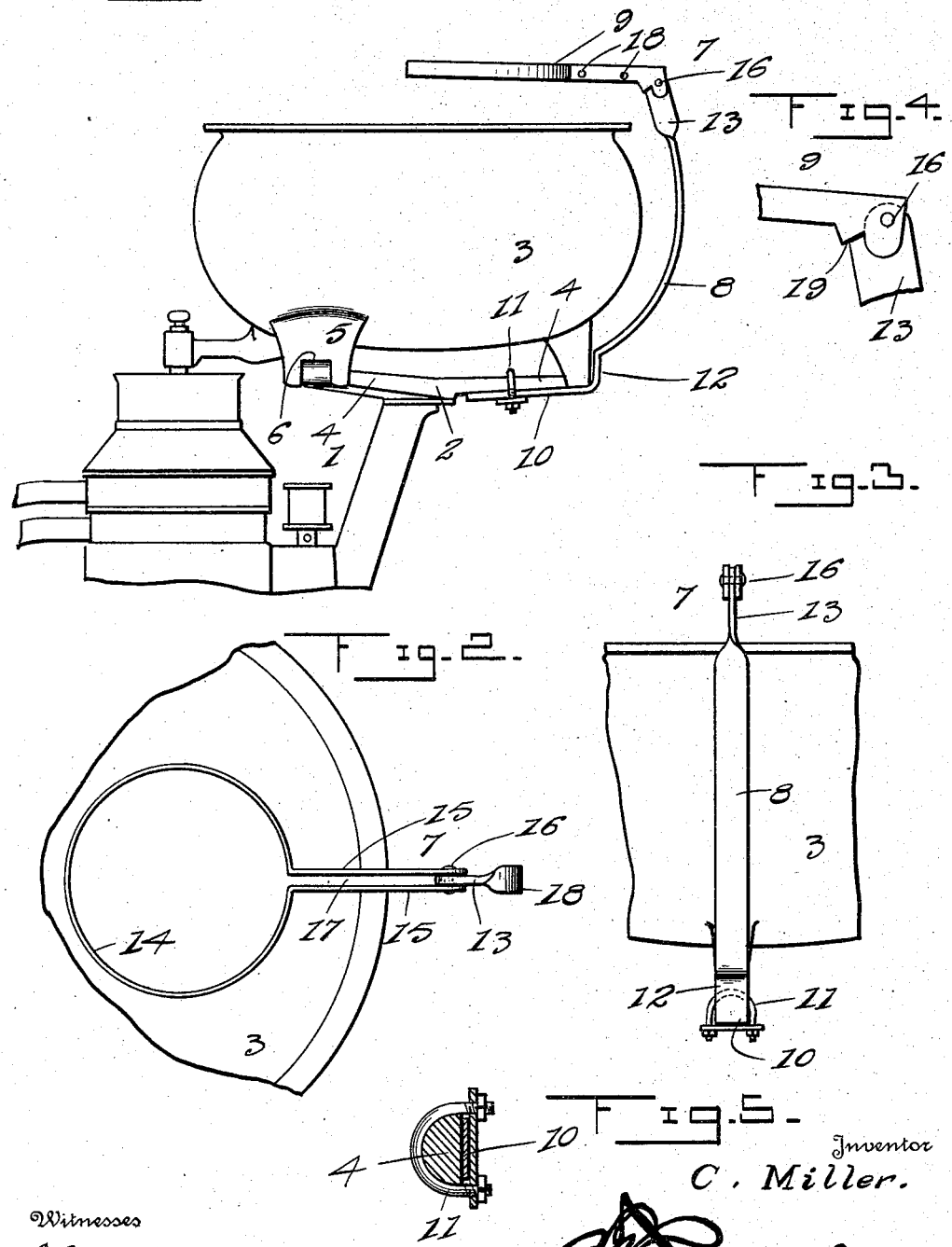

CHARLES MILLER, OF LIBERTY HILL, TEXAS.

ATTACHMENT FOR CREAM-SEPARATORS.

1,185,424.   Specification of Letters Patent.   Patented May 30, 1916.

Application filed May 22, 1915. Serial No. 29,835.

*To all whom it may concern:*

Be it known that I, CHARLES MILLER, a citizen of the United States, residing at Liberty Hill, in the county of Williamson and State of Texas, have invented certain new and useful Improvements in Attachments for Cream-Separators; and I do hereby declare the following to be a full, clear, and exact description of the invention, such as will enable others skilled in the art to which it appertains to make and use the same.

This invention relates to improvements in cream separators and especially with reference to the provision of a rack for holding a strainer and adapted to be attached to the milk bowl stand of a cream separator to hold a strainer above the milk bowl and hence enable the milk to be readily strained while supplying the same to the milk bowl.

The object of my invention is to provide a strainer rack attachment of this character which is cheap and simple in construction, which may be very readily attached to the milk bowl supporting stand, and by means of which a strainer may be arranged over the milk bowl or turned back out of the way as desired.

The invention consists in the construction, combination and arrangement of devices hereinafter described and claimed.

In the accompanying drawings;—Figure 1 is a side elevation of a strainer rack attachment constructed in accordance with my invention, showing the same attached to the milk bowl stand of a cream separator and arranged for use over the milk bowl. Fig. 2 is a plan of the same. Fig. 3 is a rear elevation of the same. Fig. 4 is a detail elevation of the joint between the standard and the bracket of the strainer rack. Fig. 5 is a detail transverse sectional view through an arm of the milk bowl stand and also through the base of the rack standard and showing the clip bolt which secures the base in place.

For the purposes of this specification the upper portion of a cream separator of usual construction is shown at 1, the milk bowl stand is shown at 2 and the milk bowl at 3. The milk bowl stand has, as is usual, three radially arranged arms 4 on which the feet 5 of the milk bowl are arranged, said radial arms extending into recesses 6 in the lower ends of the feet 5.

In accordance with my invention I provide a strainer rack attachment 7 to hold a strainer over the milk bowl, this attachment comprising a standard 8 and a bracket arm 9. The standard 8 is bent to conform approximately to the shape of one side of the milk bowl and is provided at its lower end with a foot or base 10 which bears under the rearwardly extending arm 4 of the milk bowl stand and is secured thereto by means of a clip bolt 11 which adapts the standard to be readily attached when desired. The standard also has a vertical offset portion 12 to bear against the outer end of said rearwardly extending arm 4. One or more of the clip bolts may be used as required. At its upper end the standard has a right angled bent portion 13.

The bracket arm 9 is provided with a circular portion or frame 14, to receive a suitable milk strainer and also has a pair of parallel arms 15 projecting from the rear side of said circular frame and the rear ends of which are arranged on opposite sides of the upper portion 13 of the standard 8 and connected thereto by a pivot pin 16. A metal strip 17 is secured between the arms 15 as by means of rivets 18. A rule joint 19 is formed between the standard and the bracket 9, as shown in detail in Fig. 4 so that when the bracket with the strainer is turned forwardly it supports the strainer over the milk bowl as shown in Figs. 1 and 2 and the pivotal connection between the standard and the bracket enables the latter to be turned rearwardly and away from the milk bowl when desired.

Having thus described my invention I claim;—

A strainer rack attachment for use in connection with a cream separator comprising a supporting standard having a horizontal bracket arm adapted to be secured to a milk bowl stand of said cream separator, an upwardly extending right angular portion terminating in an outwardly curved arm so as to conform to the shape of a milk bowl, and a circular bracket pivotally secured to the upper portion of said arm whereby said bracket can be swung in or out of position.

In testimony whereof I affix my signature in presence of two witnesses.

CHARLES MILLER.

Witnesses:
W. B. RUSSELL,
J. W. CONNELL.